United States Patent [19]
Michellon et al.

[11] Patent Number: 6,094,890
[45] Date of Patent: Aug. 1, 2000

[54] THERMOFORMING, FILLING, AND CAPPING RECEPTACLES

[75] Inventors: Bernard Michellon, Le Chesnay; Dominique Schwab, Versailles; Philippe Macquet, Courcouronnes, all of France

[73] Assignee: Erca S.A., Les Ulis Cedex, France

[21] Appl. No.: 09/120,415

[22] Filed: Jul. 21, 1998

[30] Foreign Application Priority Data

Jul. 21, 1997 [FR] France ..................................... 9709212

[51] Int. Cl.⁷ .................................................. B65B 47/00
[52] U.S. Cl. ................................. 53/453; 53/471; 53/478; 53/559; 53/585; 53/243; 53/282; 53/299
[58] Field of Search .............................. 53/453, 471, 478, 53/559, 243, 282, 299, 585, 557

[56] References Cited

U.S. PATENT DOCUMENTS

| | | | |
|---|---|---|---|
| 3,721,340 | 3/1973 | Kruse et al. | 53/53 |
| 3,954,374 | 5/1976 | Wommelsdorf | 425/388 |
| 3,964,237 | 6/1976 | Johansen | 53/141 |
| 4,048,781 | 9/1977 | Johansen | 53/453 |
| 4,765,121 | 8/1988 | Konstantin et al. | 53/585 |
| 4,866,907 | 9/1989 | Iuchi et al. | 53/299 |
| 5,103,618 | 4/1992 | Garwood | 53/453 |
| 5,230,201 | 7/1993 | Iuchi et al. | 53/243 |
| 5,379,571 | 1/1995 | Gottfried | 53/243 |
| 5,679,109 | 10/1997 | Gics | 53/243 |

FOREIGN PATENT DOCUMENTS

| | | |
|---|---|---|
| 0490399 | 6/1992 | European Pat. Off. . |
| 830699 | 2/1952 | Germany . |
| 4113568 | 5/1992 | Germany . |
| 2055324 | 5/1981 | United Kingdom . |

*Primary Examiner*—Brian L. Johnson
*Assistant Examiner*—Matthew Luby
*Attorney, Agent, or Firm*—Herbert Dubno; Andrew Wilford

[57] ABSTRACT

An apparatus and method for making a receptacle from a generally flat thermoplastic blank has an upstream conveyor extending along a path in a transport direction through a loading station, a heating station downstream of the loading station, and a forming station downstream from the heating station. The conveyor has a plurality of supports forming a plurality of respective throughgoing apertures spaced apart in the direction. A supply at the loading station positions a respective blank atop each of the apertures of the conveyor with a central region of each blank exposed through the respective aperture and a periphery of each blank engaging and supported by the respective support A drive connected to the conveyor advances it and the blanks carried on it step-wise through the heating and forming stations. At the heating station at least the central region of each blank is heated to a softening point. A die forming a cavity open transversely toward the path at the heating station coacts with a piston at the heating station displaceable transversely across the path into and out of the die. Displacement of the piston into the die at the forming station presses the heated central region of the blank therein into the die cavity and thereby forms the blank at the forming station into a receptacle.

15 Claims, 6 Drawing Sheets

THERMOFORMING, FILLING, AND CAPPING RECEPTACLES

FIELD OF THE INVENTION

The present invention relates to a method of and apparatus for thermoforming, filling, and capping receptacles. More particularly this invention concerns a system that produces filled and sealed plastic bottles starting from flat plastic blanks.

BACKGROUND OF THE INVENTION

In order to make a closed plastic bottle filled with a liquid or fluent material, one normally starts with a thermoplastic strip that is heated to its softening point and shaped, for instance by deep-drawing, into a row of receptacles of the desired shape. Alternately the softened portion of the strip can be deformed between a piston and die as described in U.S. Pat. Nos. 3,954,374 and 3,964,237 to create the desired shape.

Normally the starting-material strip of thermoplastic material is advanced in steps through the thermoforming device. It is unrolled from a large spool and is held along its edges over a space several millimeters wide both to advance it and hold it in place during the thermoforming operation. As a result the apparatus for unwinding and transporting the strip is cumbersome and complex, and the finished product must be trimmed, wasting from 5% to 30% of the material.

In addition to the conveying and waste problems, the use of a thermoplastic strip to form the receptacles has several other disadvantages. As a result of the shrinkage inevitably caused by the thermoforming operation, the band creeps and it is impossible to establish an accurate spacing between adjacent receptacles formed in the strip. Such inaccurate positioning is particularly troublesome when the joined-together receptacles are fed to an automatic filling, capping, and sealing system, since they will not be properly aligned. Thus the seal line for a cap will be misplaced laterally and, when the cap is subsequently trimmed, this seal line will be cut to create a leakage problem. Furthermore even if the seal line is not cut, the guillotine-style cutter normally used will exert considerable twisting forces on the receptacles if they are not cut in a perfectly flat area between receptacles, which twisting forces can open up the seal and ruin the product.

Furthermore in order to reduce wastage of the material from which the receptacles are made the pistons used for thermoforming are placed as closely as possible next to one another. This makes the equipment very dense and complex, and also makes it difficult to apply labels or otherwise act on the finished receptacles which are very close to one another. Similarly the devices that apply labels or other decoration or product identification to the closely spaced receptacles are fairly complex and expensive. What is more, when the filling operation directly follows the thermoforming operation, the receptacles must be formed to be open upward, in which position they can collect powder so the equipment must operate in a sealed so-called clean room to avoid dust and the like from collecting in the upwardly open receptacles.

In French patent 1,486,659 the receptacles are formed not from a strip but from plastic material injected as a powder or particles into a mold that is heated to melt the plastic and form the receptacle, with the mold subsequently moving along with the receptacle through the production line. The receptacles thus produced are therefore completely separate so the machinery is simplified but since the bases of the molds are closed subsequently operations are complicated. In particular only blow-molding or deep-drawing can be used which can result in nonuniform thickness in the finished receptacle. In addition only relatively shallow receptacles can be made by this method, and the production rate is invariably quite low. Such a system cannot conveniently be integrated with a filling and capping machine so that keeping them sufficiently clean for use, for instance, to package food becomes difficult.

OBJECTS OF THE INVENTION

It is therefore an object of the present invention to provide an improved system for making, filling, and capping receptacles.

Another object is the provision of such an improved system for making, filling, and capping receptacles which overcomes the above-given disadvantages, that is which wastes a minimal amount of the material from which the receptacles are made, but which lends itself to a high-volume production operation that can label the receptacles in any desired manner.

SUMMARY OF THE INVENTION

An apparatus for making a receptacle from a generally flat thermoplastic blank has according to the invention an upstream conveyor extending along a path in a transport direction through a loading station, a heating station downstream of the loading station, and a forming station downstream from the heating station. The conveyor has a plurality of supports forming a plurality of respective throughgoing apertures spaced apart in the direction. A supply at the loading station positions a respective blank atop each of the apertures of the conveyor with a central region of each blank exposed through the respective aperture and a periphery of each blank engaging and supported by the respective support. A drive connected to the conveyor advances it and the blanks carried on it step-wise through the heating and forming stations. At the heating station at least the central region of each blank is heated to a softening point. A die forming a cavity open transversely toward the path at the heating station coacts with a piston at the heating station displaceable transversely across the path into and out of the die. Displacement of the piston into the die at the forming station presses the heated central region of the blank therein into the die cavity and thereby forms the blank at the forming station into a receptacle.

The system of this invention therefore makes the receptacles from individual plates of thermoplastic, e.g. polypropylene or polyethylene terephthalate, instead of from a continuous strip. As a rule the blanks are 0.6 mm to 1.5 mm, normally 0.8 mm, thick and can easily be gripped and held on the supports of the conveyor. Each blank can be used to form a single respective receptacle, or a row of several receptacles, with the thermoforming tool forming a tear or weakened line between adjacent receptacles. Either way the relative positions of the receptacles, even if three or four are formed from a common blank, will be very accurate so that subsequent filling, capping, and sealing machines can be counted on to work perfectly. The problems associated with cutting the receptacles apart are not present at all and in fact such a cutter can be eliminated altogether. For example it is possible to produce the standard four-pack of yoghurts that are commercially sold with the system of this invention, each such pack being produced from a single blank.

According to the invention the conveyor is provided with means for retaining the periphery of each of the blanks in place against the respective support over the respective aperture. This means can be a simple seat that is complementary to the blank, normally of circular or rounded-corner square shape, formed by a continuous edge or retaining lugs, and/or can actually be hold-down elements.

The loader includes a supply hopper holding a stack of the blanks and having a vertical side wall formed at a base of the stack with a slot having a height equal generally to a height of one of the blanks, a slide displaceable at the base of the stack between a retracted position mainly outside the hopper and an advanced position outside the hopper, means for reciprocating the slide synchronously with the conveyor from the retracted to the advanced position for pushing a blank at the base of the stack out through the slot, and means adjacent the hopper for picking up the blanks pushed through the slot and setting them on the conveyor. Thus the blanks can be fed rapidly out and loaded onto the supports of the conveyor. In a standard system each support has four apertures and there is ample time for the loader to load four separate blanks into place during one step of the conveyor.

The heater includes means for maintaining the peripheries of the blanks in the heating station at a temperature below that of the respective central regions. Thus the peripheries retain the necessary rigidity for handling of the workpieces and holding them in place. It is possible for this means to be a shield engageable with the periphery of each blank in the heating station. In addition the shield can be provided with means for actively cooling the periphery of each blank in the heating station.

The die is above the path and the piston is displaceable between a lower position below the path and an upper position above the path and inserted into the die cavity so that after thermoforming the receptacles are downwardly open. Since they are downwardly open, they will normally remain perfectly clean, something that is very important if the receptacles are to be used for food, eliminating the need to subsequently clean and/or sterilize them before filling. Thus the need to work in a special clean room is eliminated.

Furthermore according to the invention a downstream conveyor extends in the direction downstream from the forming station through a filling station and through a capping station downstream of the filling station and means is provided for inverting the receptacles and transferring them from a downstream end of the upstream conveyor to an upstream end of the downstream conveyor. The receptacles are filled at the filling station and capped at the capping station for applying caps to the receptacles.

The inverting device includes a grab grippable around the receptacle at the upstream-conveyor downstream end and means for pivoting the grab through about 180° and depositing the gripped receptacle on the downstream-conveyor upstream end. Thus the receptacles are not turned over until the last moment before they are filled, ensuring that they stay clean. Furthermore the separate downstream conveyor further ensures that complete sterility can be maintained in the critical filling area.

The grab in accordance with the invention includes a pair of pincer arms. In addition means is provided downstream of the capper for applying a label to the receptacle. Such a labeler can include means for fitting shrinkable sleeves to the receptacles, and means for shrinking the sleeves onto the receptacles.

The method according to the invention has according to the invention the steps of displacing a conveyor step-wise along a path in a transport direction through a loading station, a heating station downstream of the loading station, and a forming station downstream from the heating station with apertures of the conveyor stopping momentarily in each of the stations. A respective flat thermoplastic blank is set atop each of the apertures of the conveyor in the loading station with a central region of each blank exposed through the respective aperture and at least the central region of each blank is heated to a softening point in the heating station. A piston is displaced in the forming station across the path and into and out of a die on the other side of the path while engaging the heated central region of the blank in the forming station to form the blank at the forming station into a receptacle.

Such a method uses materials very economically, with no waste at all as the blank need not be trimmed once the receptacle is formed. It can nonetheless be operated at a high throughput, in particular when the blanks are stored in a stack adjacent the loading station and at the loading station and the blanks are separated one at a time from the stack and set atop the conveyor.

As mentioned above the periphery of each blank is maintained below the softening point of the blank in the heating station. The piston is displaced between a lower position below the path into an upper position above the path to deform the blanks and form them into downwardly open receptacles. The method also includes the step of inverting the recipients downstream of the forming station, and filling the inverted recipients. A heat-shrinkable sleeve can be fitted around each recipient downstream of the forming station and shrunk into place thereon. Alternately a label can be stamped on each of the recipients downstream of the forming station.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
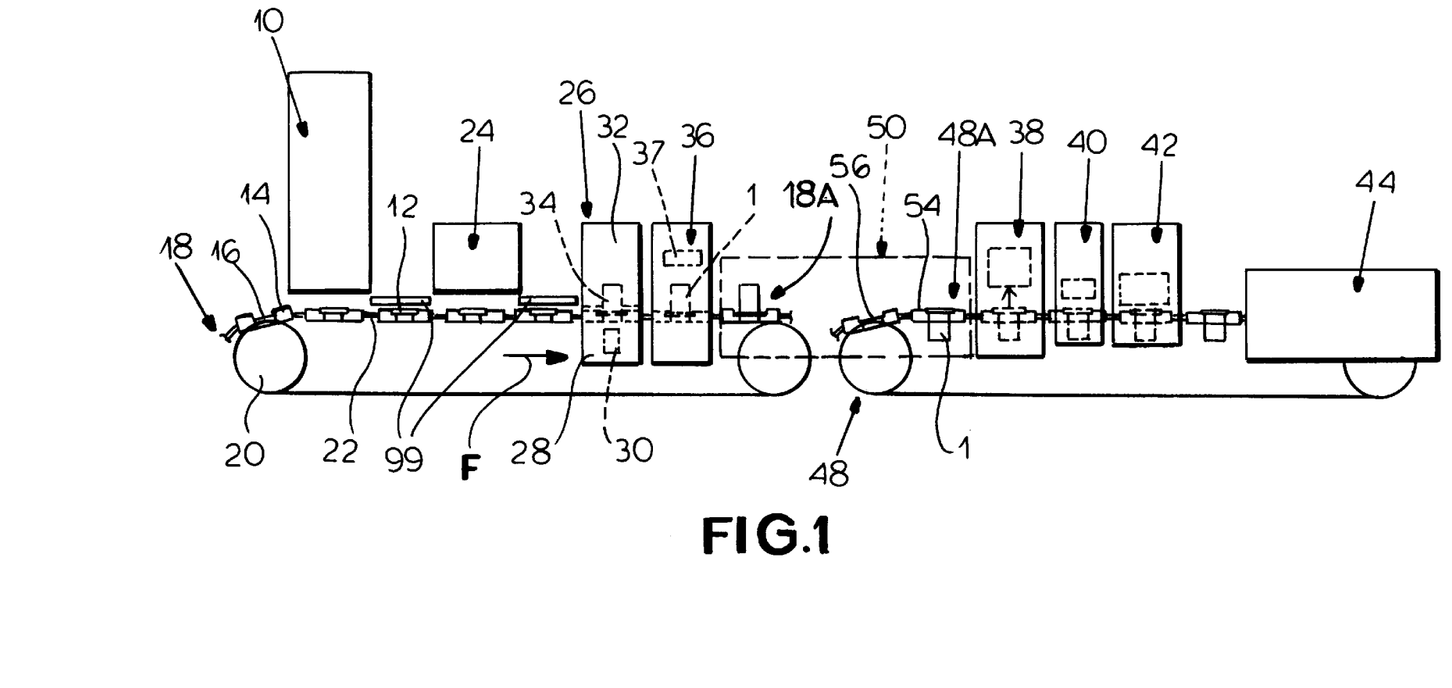
FIG. 1 is a small-scale partly schematic side view of the apparatus according to the invention.
Figure 2:
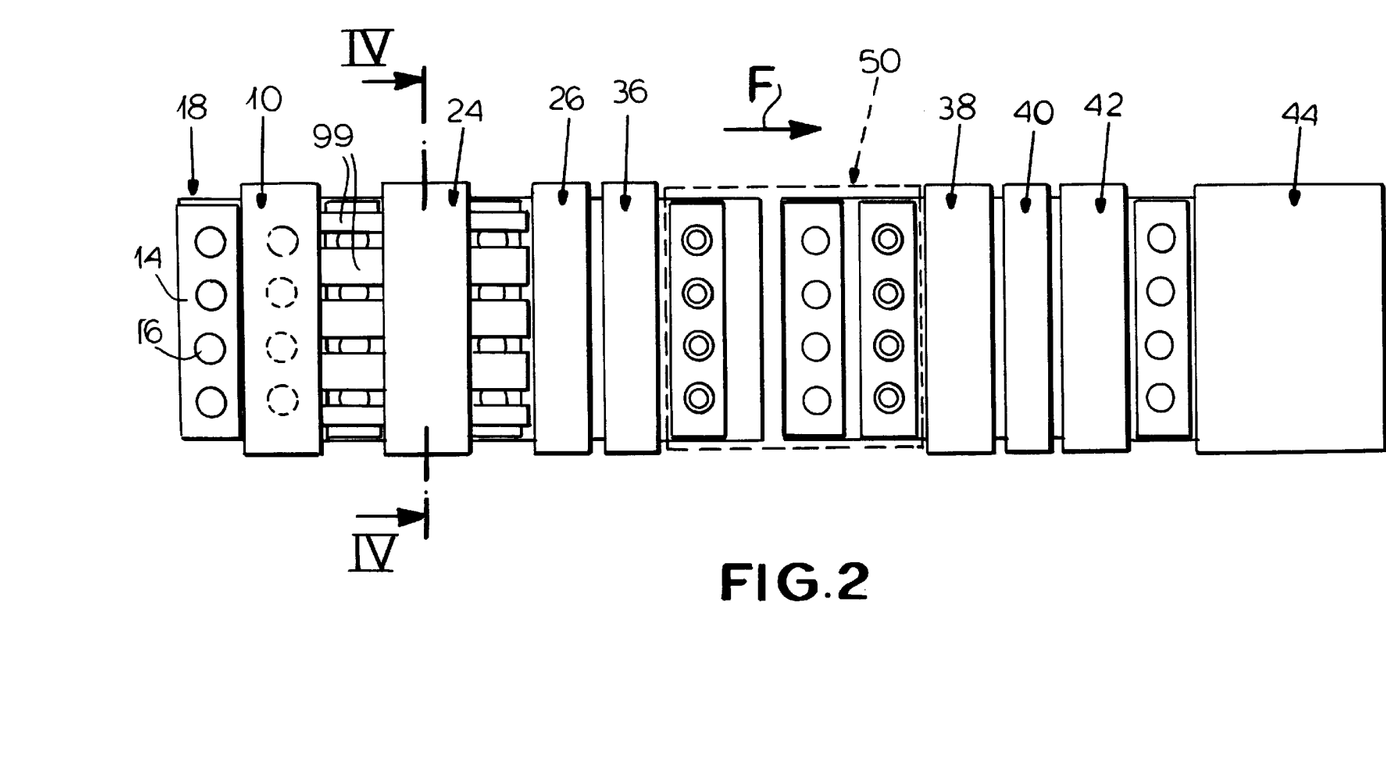
FIG. 2 is a top view of the apparatus of FIG. 1.

As seen in FIGS. 1 and 2 an apparatus according to the invention for making receptacles 1 from blanks 12 has an upstream conveyor 18 and a downstream conveyor 48 mounted on drive rollers 20 and having upper stretches moving in a horizontal transport direction F. The upstream conveyor 18 passes through a loading station 10, a heating station 24, a thermoforming station 26, and a decorating station 36. An inverting station 50 at the downstream end 18A of the upstream conveyor 18 takes the receptacles 1 off the upstream conveyor 18, inverts them, and sets them on the upstream end 48A of the downstream conveyor 48. The downstream conveyor 48 passes through a filling station 38, a capping station 40, and a sealing station 42 and ends at an unloading station 44 whence the finished articles are packaged and sent out.

Figure 3:
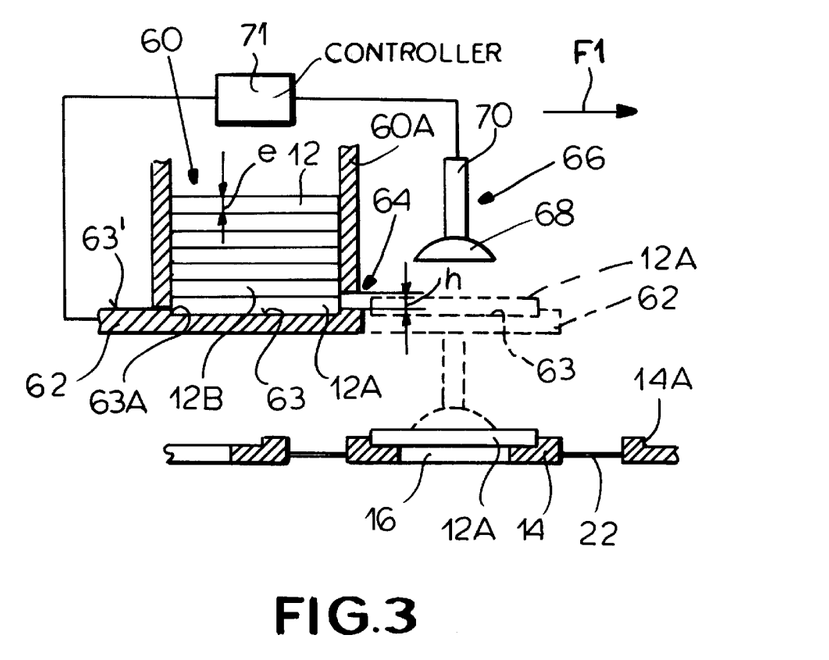
FIG. 3 is a partly diagrammatic and sectional view of the blank supply and loader of the invention.

The upstream conveyor 18 is comprised of a plurality of rigid plate-like supports 14 each formed with a plurality, here four, of circular apertures aligned in a row transverse to the direction F and the downstream conveyor (see FIGS. 6–8) is similarly formed of plates 54 having apertures 56. As shown in FIG. 3 each of the circular apertures 16 is surrounded by a shoulder 14a forming a recessed seat for the circular blanks 12. The supports are interconnected by flexible bands 22 permitting them to ride like a belt around the rollers 20.

FIG. 3 shows how the loading station 10 comprises a bin or hopper 60 having a side wall 60A and provided with a stack of the blanks 12 which have vertical thicknesses e. A slide 62 forms a base of the hopper 60 and has an upper surface 63' formed with a circular recess 63 forming a seat complementary to the blanks 12 and having a rear edge 63A. The side wall 60A of the hopper 60 forms a slot 64 of a height h equal to slightly more than the blank thickness e with the slide 62 so that when the slide 62 is advanced by a controller shown at 71 from the solid-line position to the dashed-line position, the lowermost blank 12A of the stack in the hopper 60 is pushed out through the slot 64 by engagement with the edge 63A, while the overlying blank 12B is blocked against such movement and stays in the hopper 60. Once the lowermost blank 12A is outside the hopper 60, the next blank 12B will be able to drop down and, when the slide 62 is retracted, fit into the seat 63.

A transfer device 66 effective in a horizontal direction F1 perpendicular to the direction F has a suction cup 68 that can be evacuated by the controller 71 and a pneumatic actuator 70 that can raise and lower it. Once the slide 62 is all the way into the extended position, the actuator 70 drops the suction grab 68 down onto the blank 12A held by it and raises it off the slide 62, whereupon the controller 71 moves the entire transfer device 66 in the direction F1 to set the lifted blank into one of the seats of the support 14 aligned adjacent it whereupon the cup 68 is depressurized to release the blank 12A. This operation is repeated quickly four times as the support 14 is arrested in the station 10 to fill each of its seats, with each blank 12 positioned with its central region 13B sitting over one of the apertures 16 and its periphery 13A fitting in the seat shoulder 14A as shown in FIG. 4.

Figure 4:
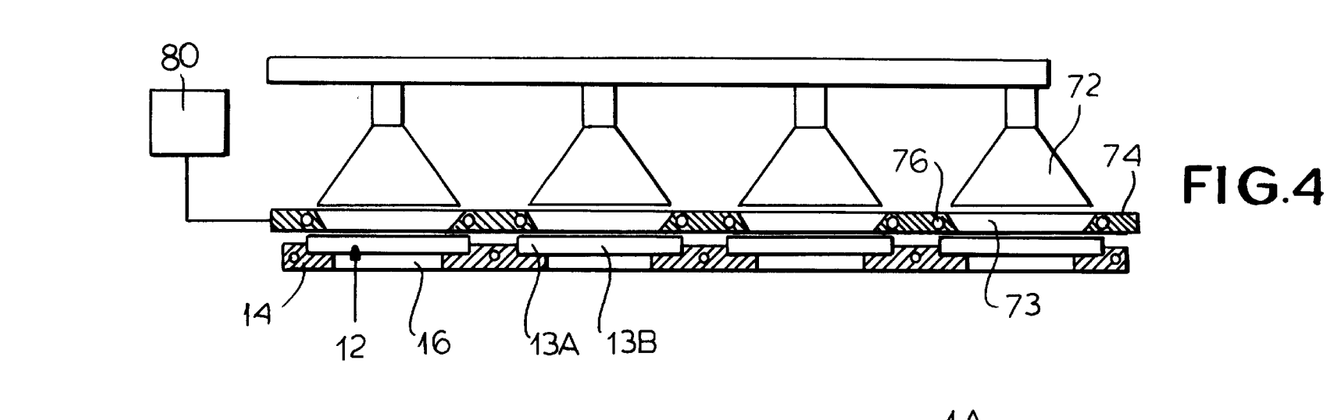
FIG. 4 is a section taken along line IV—IV of FIG. 2.

In the heating station as shown in FIG. 4 there are four infrared heaters 72 positioned above a shield 74 formed with apertures 73 that leave only the central regions 13B of the underlying blank 12 exposed, with their peripheries 13A shielded and protected from being heated. In fact the shield 74 is formed with passages 76 through which a coolant is circulated by a device 80 to ensure that the peripheries 13A do not soften, but instead remain hard and rigid. The shield 74 can be vertically displaceable to actually engage and physically cool the peripheries 13A.

Figure 5:
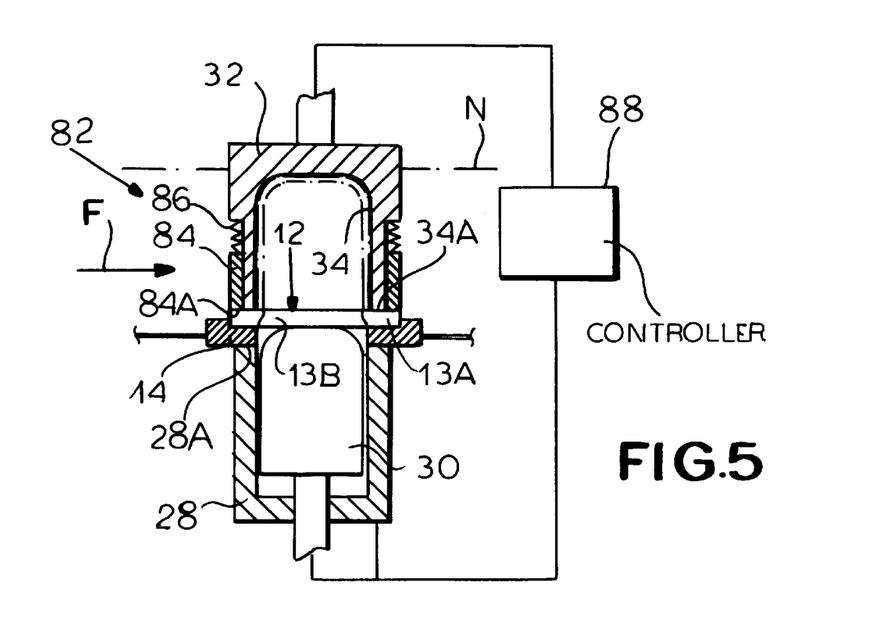
FIG. 5 is a partly diagrammatic and sectional view of a thermoformer according to the invention.

FIG. 5 shows the forming station. It has a vertically displaceable piston 30 that can engage in a cavity 34 of a vertically displaceable die 32, both operated by a controller 88. The piston 30 has the desired internal shape of the receptacle to be produced and the cavity 34 the desired outside shape. The die 32 is provided with a hold-down device or means 82 constituted by an external ring or elements 84 having lower edges 84A urged by springs 86 downward past a lower edge 34A of the die 32. Of course there are four such pistons 30 and dies 32 at the station 28 for simultaneous thermoforming of four receptacles 1.

Thus once a support 14 comes to rest with four heated blanks 12 in the station 28, the dies 32 will each first be pressed down atop the periphery 13A of the blank, with at first the ring 84 engaging the blank 12 and then the edge 34, and both pressing the periphery 13A down against a fixed support surface 28A surrounding the piston 30. This action therefore solidly clamps the blank 12 and support 14 in place. Then the piston 30 is advanced upward to deform the heated central region 13B into the desired receptacle shape, forming a downwardly open receptacle 1.

After the desired shape is achieved, the piston 30 is retracted downward below the level of the support 14. Then the die 32 is raised, which action first presses the receptacle shown in dot-dash lines down slightly with the edge 84A so as to unstick it from the cavity 34, and then retracting the entire die 32 so it lies above a level N completely above the freshly formed receptacle, permitting the finished receptacles to be conveyed away in the direction F. Thus the hold-down device 82 prevents the thermoformed workpiece 1 from being lifted off the support 14 as the die 32 is raised.

In the station 36 it is possible to stamp indicia onto the inverted receptacles 1. In addition heat-shrinkable sleeves such as shown in FIG. 1 at 37 that carry product identification can be fitted over the still hot receptacles 1, whereupon they will shrink tightly into place.

Figure 6:
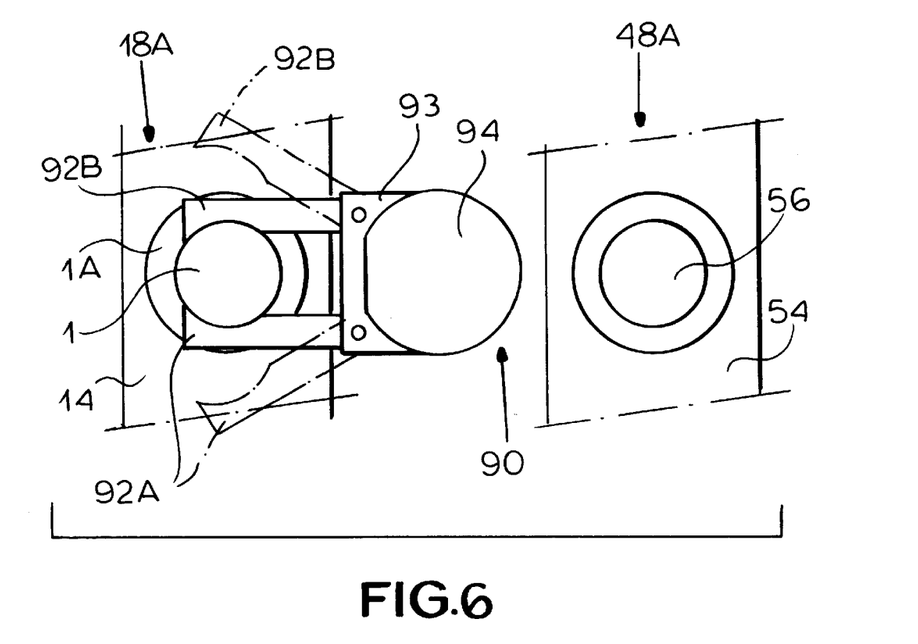
FIG. 6 is a top view of the inverting transfer device.

Once the labeled receptacles 1 reach the downstream end 18A of the conveyor 18 they are each gripped as shown in FIG. 6 between a pair of arms 92A and 92B pivoted on a plate 93 of a head 94 of a gripper 90. The head 94 can be rotated about a horizontal axis A perpendicular to the direction F and also raised and lowered limitedly by an actuator 96 operated by a controller 98. Of course four such grippers 90 are provided that work synchronously.

Figure 7:
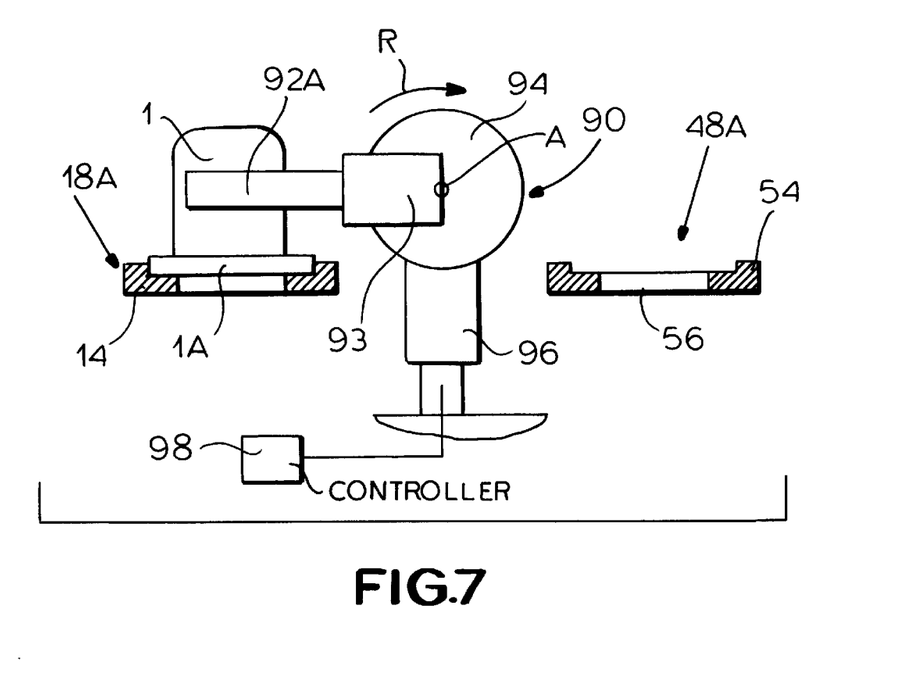
FIG. 7 is a side view of the device of FIG. 6.
Figure 8:
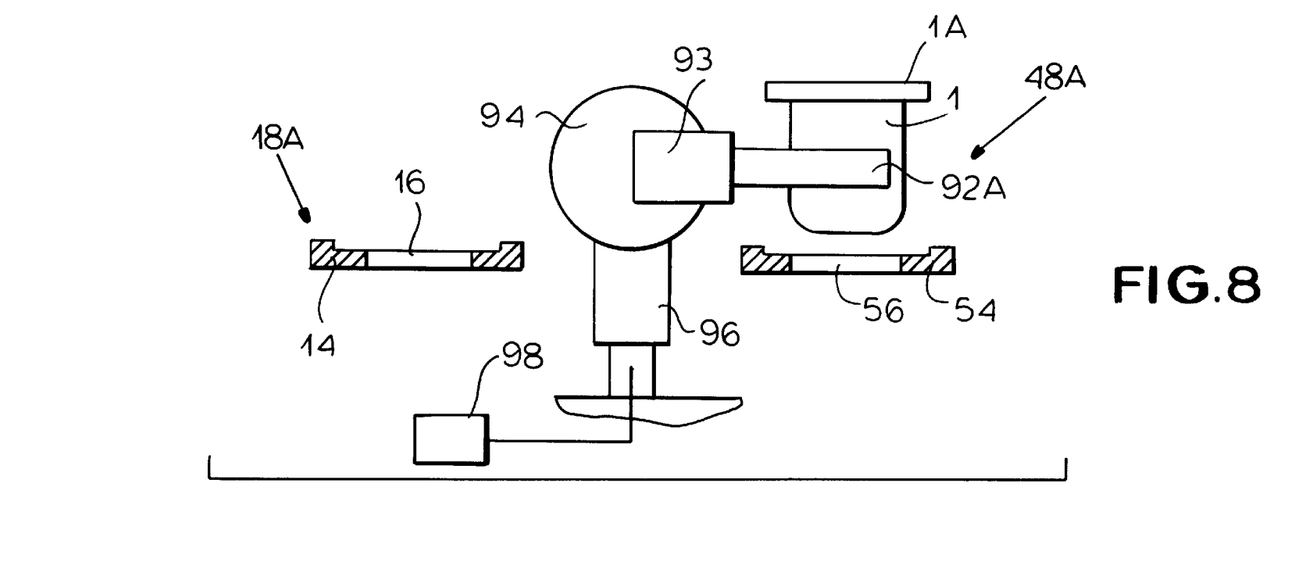
FIG. 8 is a view like FIG. 7 but with the device in a different position.

Thus once a row of the receptacles 1, which are sitting on their rims 1A and open downward, arrive at the downstream end 18A of the conveyor 18, the arms 92A and 92B are moved from the dot-dash to the solid-line position to grip them, and then the heads 94 are raised slightly and pivoted through 180° as shown by arrow R in FIG. 7 until as shown in FIG. 8 they are positioned in an upwardly open position over the apertures 56 of the upstream end 48a of the downstream conveyor 48. The actuator 96 then lowers the receptacles 1 and the arms 92A and 92B are spread to fit these receptacles 1 into the apertures 56 in an upwardly open position. Subsequently they are filled at 38, capped at 40, and sealed at 42 to finish preparation of the product.

Figure 9:
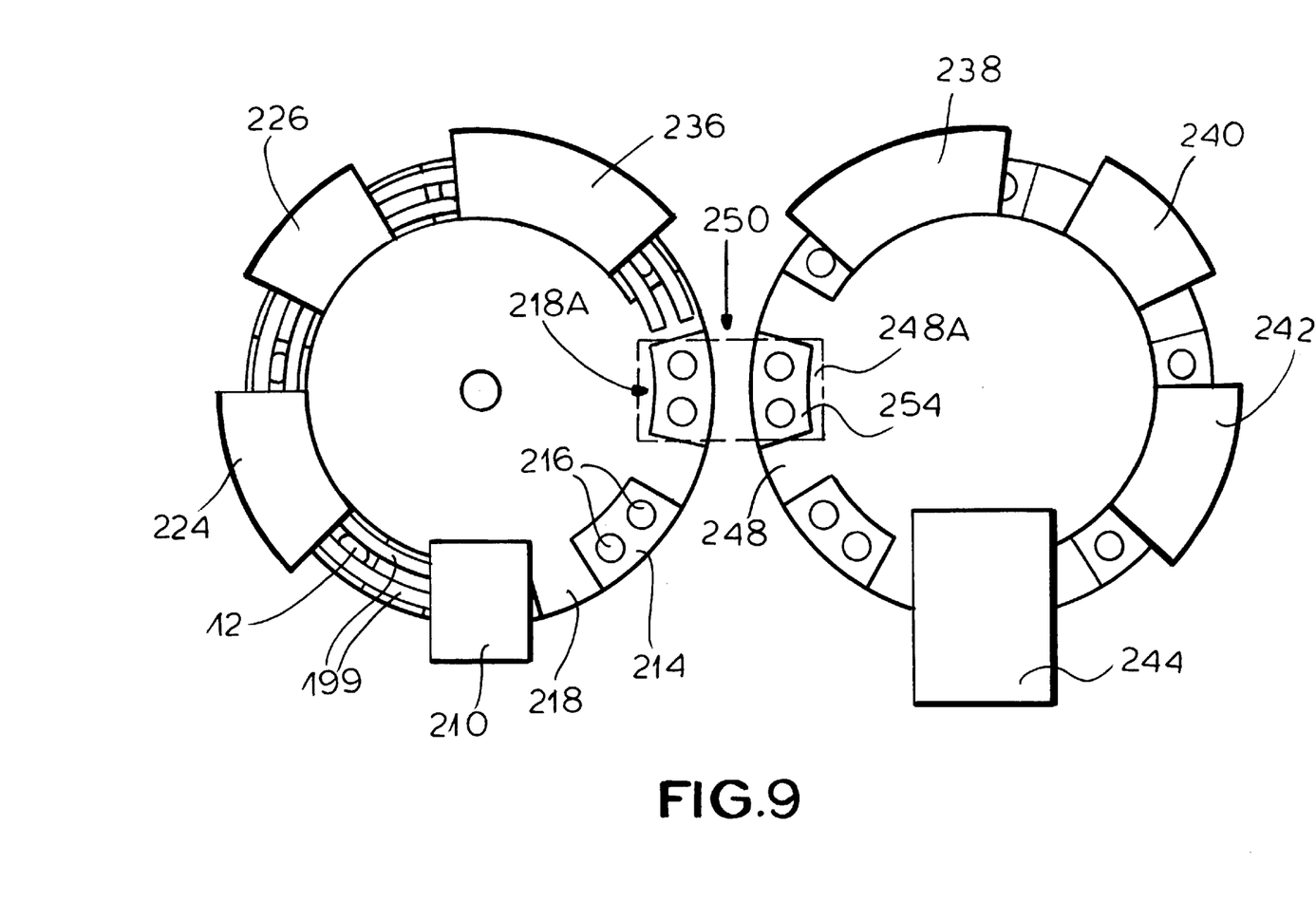
FIG. 9 is a top view of an alternative system in accordance with the invention.

FIG. 9 shows an arrangement where reference numerals for structure functionally similar to that of FIGS. 1 through 8 are used, augmented by 200. Here a pair of carousel conveyors 218 and 248 are used, with hold-down bars 199 being employed to keep the blanks 12 in place as they move from the loading station 210 through the stations 224, 226, and 236. Only two apertures 216 are provided in each support 214 so that this device is intended for a limited-production operation.

We claim:

1. An apparatus for making a receptacle from a generally flat thermoplastic blank, the apparatus comprising:

an upstream conveyor extending along a path in a transport direction through a loading station, a heating station downstream of the loading station, and a forming station downstream from the heating station, the conveyor having a plurality of supports forming a plurality of respective throughgoing apertures spaced apart in the direction;

means at the loading station for positioning a respective blank atop each of the apertures of the conveyor with a central region of each blank exposed through the respective aperture and a periphery of each blank engaging and supported by the respective support;

drive means connected to the conveyor for advancing it and the blanks carried on it step-wise through the heating and forming stations;

means at the heating station for heating at least the central region of each blank;

a die above the path forming a cavity open transversely and downward toward the path at the forming station;

a piston at the forming station below the path displaceable transversely across the path into and out of the die;

means for displacing the piston into the die at the forming station, thereby pressing the heated central region of the blank therein into the die cavity and thereby forming the blank at the forming station into a downwardly open receptacles a downstream conveyor extending in the direction downstream from the forming station through a filling station and through a capping station downstream of the filling station;

means for inverting the receptacles and transferring them from a downstream end of the upstream conveyor to an upstream end of the downstream conveyor;

means at the filling station for filling the receptacles; and means at the capping station for applying caps to the receptacles.

2. The apparatus defined in claim 1 wherein the conveyor is provided with hold-down means for retaining the periphery of each of the blanks in place against the respective support over the respective aperture.

3. The apparatus defined in claim 1 wherein the heating means includes means for maintaining the peripheries of the blanks in the heating station at a temperature below that of the respective central regions.

4. The apparatus defined in claim 3 wherein the means for maintaining includes a shield engageable with the periphery of each blank in the heating station.

5. The apparatus defined in claim 4 wherein the shield is provided with means for actively cooling the periphery of each blank in the heating station.

6. The apparatus defined in claim 1 wherein the inverting means includes a grab grippable around the receptacle at the upstream-conveyor downstream end and means for pivoting the grab through about 180° and depositing the gripped receptacle on the downstream-conveyor upstream end.

7. The apparatus defined in claim 6 wherein the grab includes a pair of pincer arms.

8. The apparatus defined in claim 6, further comprising means downstream of the capping means for applying a label to the receptacle.

9. The apparatus defined in claim 1, further comprising:
means for fitting shrinkable sleeves to the receptacles; and
means for shrinking the sleeves onto the receptacles.

10. An apparatus for making a receptacle from a generally flat thermoplastic blank, the apparatus comprising:
an upstream conveyor extending along a path in a transport direction through a loading station, a heating station downstream of the loading station, and a forming station downstream from the heating station, the conveyor having a plurality of supports forming a plurality of respective throughgoing apertures spaced apart in the direction;

means at the loading station for positioning a respective blank atop each of the apertures of the conveyor with a central region of each blank being exposed through the respective aperture and a periphery of each blank engaging and supported by the respective support, the loading means including
a supply hopper holding a stack of the blanks and having a vertical side wall formed at a base of the stack with a slot having a height equal generally to a height of a one of the blanks;
a slide displaceable at the base of the stack between a retracted position mainly outside the hopper and an advanced position outside the hopper;
means for reciprocating the slide synchronously with the conveyor from the retracted to the advanced position for pushing a blank at the base of the stack out through the slot; and
means adjacent the hopper for picking up the blanks pushed through the slot and setting them on the conveyor;

drive means connected to the conveyor for advancing it and the blanks carried on it step-wise through the heating and forming stations;

means at the heating station for heating at least the central region of each blank;

a die forming a cavity open transversely toward the path at the forming station;

a piston at the forming station displaceable transversely across the path into and out of the die; and means for displacing the piston into the die at the forming station, thereby pressing the heated central region of the blank therein into the die cavity and thereby forming the blank at the forming station into a receptacle.

11. A method of making and filling receptacles comprising the steps of:
displacing an upstream conveyor step-wise along a path in a transport direction through a loading station, a heating station downstream of the loading station, and a forming station downstream from the heating station with apertures of the conveyor stopping momentarily in each of the stations;

displacing a downstream conveyor in the direction from an inverting station immediately downstream of the forming station and through a filling station;

setting a respective flat thermoplastic blank atop each of the apertures of the upstream conveyor in the loading station with a central region of each blank exposed through the respective aperture;

heating at least the central region of each blank to a softening point in the heating station;

displacing a piston in the forming station from a lower position across the path and into and out of a die on the other side of the path while the piston engages the heated central region of the blank in the forming station to form the blank at the forming station into a downwardly open receptacle;

inverting the receptacles in the inverting station downstream of the forming station and setting the inverted receptacles onto the downstream conveyor upstream of the filling station; and filling the inverted receptacles in the filling station.

12. The method defined in claim 11 wherein the blanks are stored in a stack adjacent the loading station and at the loading station the blanks are separated one at a time from the stack and set atop the upstream conveyor.

13. The method defined in claim 11, further comprising the step of maintaining the periphery of each blank below the softening point of the blank in the heating station.

14. The method defined in claim 11, further comprising the steps of:

fitting a heat-shrinkable sleeve around each receptacle downstream of the forming station; and shrinking the sleeves onto the receptacles.

15. The method defined in claim 11, further comprising the step of stamping a label on each of the receptacles downstream of the forming station.

* * * * *